June 10, 1924.                                                          1,496,831
L. SCHÖN ET AL
OVERLOAD SWITCH FOR ALTERNATING CURRENT
Original Filed Sept. 4, 1920
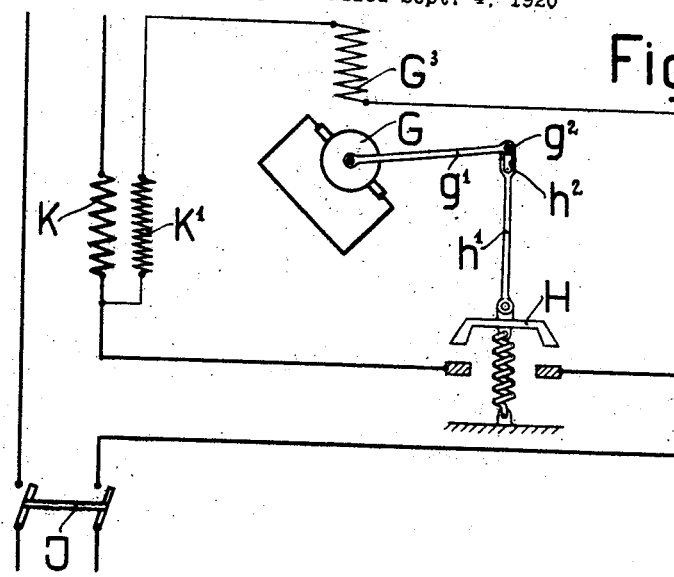
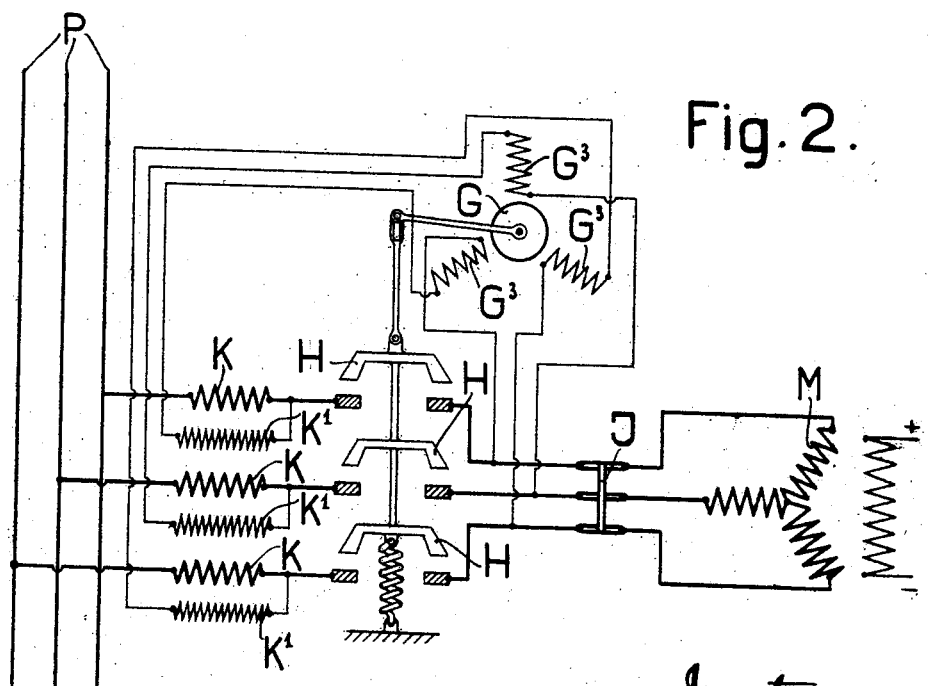

Patented June 10, 1924.

1,496,831

UNITED STATES PATENT OFFICE.

LUDWIG SCHÖN AND JAKOB PFRETZSCHNER, OF ESSEN, GERMANY, ASSIGNORS TO FRIED. KRUPP AKTIENGESELLSCHAFT, OF ESSEN-ON-THE-RUHR, GERMANY.

OVERLOAD SWITCH FOR ALTERNATING CURRENT.

Original application filed September 4, 1920, Serial No. 408,383. Divided and this application filed September 3, 1921. Serial No. 498,442.

(GRANTED UNDER THE PROVISIONS OF THE ACT OF MARCH 3, 1921, 41 STAT L., 1313.)

*To all whom it may concern:*

Be it known that we, LUDWIG SCHÖN, residing at Essen, Germany, and JAKOB PFRETZSCHNER, residing at Essen, Germany, both subjects of the Republic of Germany, have invented a certain new and useful improvement in Overload Switches for Alternating Current, of which the following is a specification.

This is a division of our patent application Ser. No. 408,383.

This invention relates to overload switches for alternating current having a magnetic field adapted to be excited both by the current of the circuit which is to be protected and by an auxiliary circuit. The object of the invention is first and foremost to provide an overload switch of the type above referred to which possesses the property of not being able to close spontaneously again after the removal of the disturbing cause but on the contrary remains open until the auxiliary circuit is interruped anywhere. In the second place it is the object of the invention to give the overload switch such a form that it constitutes also an automatic device for connecting in parallel two alternating current circuits. This double object is attained by providing a small motor co-operating with a transformer, to which motor the movable part of the switch is positively connected. Such overload switch, the construction of which is moreover the like for both employments, is distinguished by simplicity, convenience of manipulation and great reliability of action.

The invention will be described with reference to the accompanying drawings which illustrate diagrammatically two embodiments of an overload switch according to the said invention.

Figure 1 shows a device suitable for the use in single phase circuits and

Figure 2 a similar device suitable for the use in three phase circuits.

In the overload switch illustrated in Figure 1 there is mounted upon the shaft of the rotor G of a single phase motor of the repulsion type an arm $g^1$ which terminates in a pin $g^2$. By the aid of this pin it engages in a slot $h^2$ in a bar $h^1$ pivoted to the contact brush H of the switch placed in the circuit which is to be interrupted. In this circuit which may be intended to supply a current consumer, is included also a bipolar hand-operated switch J and the primary winding K of a transformer. The secondary circuit of the transformer, which contains its secondary winding $K^1$ and the field winding $G^3$ of the motor connected in series, is connected to the main current circuit in parallel with the interruption point thereof.

When the switches H and J are closed and the current consumer is taking current normally, the branch circuit containing the field winding $G^3$ of the repulsion motor is only traversed by the weak current which is induced in the secondary winding $K^1$ of the transformer K $K^1$. The strength of this induced current, which is proportional to the strength of the current flowing in the primary winding K, does not suffice however to produce in the motor G, $G^3$, a turning moment which would be sufficient to open the switch H. The conditions are preferably so arranged that only in the case of an absolutely fixed current strength in the main current circuit exceeding the normal does the tractive force of the switch motor overcome the spring power of the switch, and move the switch H into the switched out position shown. After such interruption in the main current circuit a current flows from the main across the windings K, $K^1$, and $G^3$, now in series, which current is strong enough to impart to the motor a turning moment by which the switch H is held fast in the switched out position. Only when the current consumer, which had caused the excessive rise of the current strength in the main current circuit, has been switched off by opening the hand operated switch J, is the current cut off from the shunt containing the windings $K^1$, and $G^3$, whereby the motor G, $G^3$, loses its turning moment and the switch H moves into its switched in position.

In Figure 2 is shown an arrangement suitable for three phase currents. In accordance with the number of phases the transformer K, K¹, connected to a three phase main P and the motor switch motor G, G³, (supposed in the present case to be an induction motor with a short-circuited armature) is three phase and the automatic switch H and the hand-operated switch J, are constructed of tripolar form. M denotes a synchronous machine excited by a continuous current which is adapted to act both as a rotary current generator and a synchronous current motor. The stroke of the automatic switch H is adjustable, in a manner not shown, to a magnitude at which small switch movements, out of the switched-out position of the switch are possible, but which does not bring about a closing of the main current circuit.

The working of this form of the automatic switch which acts as heretofore stated when there is an overload, corresponds in all points to that of the single phase arrangement shown in Figure 1.

The arrangements in Figures 1 and 2 possess however the very important subsidiary action that they can also be used for connecting automatically in parallel, two single or polyphase alternating current circuits. This will be more fully explained with reference to Figure 2. Let one circuit be constituted by the main P and the other, which is the one to be switched on, by the synchronous machine M. So long as the direction of rotation of the synchronous machine M, for example, is in the wrong direction or there is a considerable divergence between its tension, frequency and phase and the corresponding magnitudes of the main P, the field winding G³ of the switch motor G, G³, remains (under the assumption that the hand-operated switch J is closed) permanently excited and the switch H remains in the switched out position.

When the synchronous machine M rotates in the correct direction, the differences in the tension, frequency and phase, can however be gradually diminished to such an extent that the turning moment of the motor switch G, G³ becomes less and less, for the reason that the excitation of the switch motor becomes weaker the smaller the differences mentioned above become. In consequence thereof the switch H begins to execute movements which gradually become larger but still do not suffice to bring it into the switched in position.

As soon as the condition of the approximate concordance of tension, frequency and phase, which as is well known is periodically repeated, lasts long enough, the turning moment of the switch motor G, G³, drops to such an extent that the spring power of the switch preponderates, whereupon the switch at once switches in. The main P and the synchronous machine M are then connected up in parallel. The switch motor G, G³, is now no longer excited by the main tension but by the tension induced in the transformer K, K¹. In the case of overloads the switch works therefore in exactly the same way as the switch motor shown in Figure 1. When a switching out has taken place owing to overloading, the parallel connection is of course also cut-out in consequence thereof. As soon as the cause which produced the overload has ceased to act, the parallel connection will be restored in the manner described above.

Claims.

1. In an electrical protective system, a main circuit, an overload switch in said circuit, means normally tending to close said switch, an auxiliary circuit normally having a current therein responsive to the current in the main circuit, an electric motor excited from said auxiliary circuit, and operatively connected to said switch for opening the same against said closing means and for retaining said switch in the open position and means for interrupting the auxiliary circuit to cause said switch to close.

2. In an electrical protective system, a main circuit, an overload switch in said circuit, means normally tending to close said switch, a transformer comprising a primary winding in said main circuit and a secondary winding, one extremity of which is connected to said primary winding, an auxiliary circuit connected in parallel to the break of said overload switch and containing said secondary winding, a motor operatively connected to said overload switch and comprising a stator winding excited by said auxiliary circuit, and a closed rotor winding, for opening the said overload switch and retaining the same open, and a manually operated switch in said main circuit for interrupting the current in said auxiliary circuit.

3. An overload switch for protecting an alternating current circuit comprising means tending to close the switch, a main circuit whose current is controlled by the operation of the switch, an auxiliary circuit whose current is permitted to flow independent of said switch control, an electric motor operatively connected to said switch and dependent upon the simultaneous flow of excessive main and of the auxiliary current, for opening said switch against said closing means, but adapted to retain the switch in open position by the auxiliary current alone then flowing, means for cutting off the auxiliary current supply to permit the closing of said overload switch, a second main circuit containing a separate alternating current source of approximately the same voltage, frequency, and phase as said first mentioned main circuit, for the purpose of being connected in parallel automatically to said first mentioned main circuit when the overload switch closes; and conductors connecting said second main circuit to said overload switch, said conductors including said means for cutting off the auxiliary circuit supply.

The foregoing specification signed at Essen, Germany, this 10th day of August 1921.

LUDWIG SCHÖN,
JAKOB PFRETZSCHNER.